United States Patent [19]

Groux et al.

[11] 3,968,097

[45] July 6, 1976

[54] VEGETABLE PROTEIN EXTRACTION AT A PH 1-5-3 USING GEL FILTRATION

[75] Inventors: Michel John Arthur Groux, Lauperswil; Ernesto Dalan, Vevey; Jan Kruseman, Coriser-sur-Vevey; Pierre Yves Bertschy, Chardonne, all of Switzerland

[73] Assignee: Societe d'Assistance Technique pour Produits Nestle S.A., Lausanne, Switzerland

[22] Filed: Apr. 2, 1974

[21] Appl. No.: 457,227

[30] Foreign Application Priority Data
Apr. 17, 1973  Switzerland.......................... 5528/73

[52] U.S. Cl. .......................... 260/123.5; 260/112 R
[51] Int. Cl.² ............................................. A23J 1/14
[58] Field of Search ...................... 260/123.5, 112 R

[56] References Cited
UNITED STATES PATENTS

| | | | |
|---|---|---|---|
| 2,272,562 | 2/1942 | Iwamae............................ | 260/123.5 |
| 2,881,076 | 4/1959 | Sair.............................. | 260/123.5 X |
| 3,099,649 | 7/1963 | Kawamura et al................ | 260/123.5 |
| 3,547,900 | 12/1970 | Dienst et al................... | 260/123.5 X |
| 3,723,407 | 3/1973 | Miller et al..................... | 260/123.5 |

OTHER PUBLICATIONS

Encyclopedia of Chem. Tech., vol. 18, 1970, Kirk et al., pp. 603–610.

*Primary Examiner*—Howard E. Schain
*Attorney, Agent, or Firm*—Watson Leavenworth Kelton & Taggart

[57] ABSTRACT

A process for the preparation of a soluble protein fraction which comprises extracting a protein-containing vegetable material with an aqueous medium at a pH value below 4, treating the resulting aqueous extract by gel filtration at a pH value below 4 and recovering a soluble protein fraction by elution.

9 Claims, No Drawings

VEGETABLE PROTEIN EXTRACTION AT A PH 1-5-3 USING GEL FILTRATION

The present invention is concerned with the preparation of a soluble protein fraction from a protein-rich plant material.

Various extraction, separation and/or refining processes are known for recovering proteins from plant seeds, such as for example de-fatted soya beans or cotton, kapok, sunflower, rape or sesame seed. These processes provide readily, and at not great cost, an industrially usable protein raw material. These processes may comprise extraction in an alkaline or acid aqueous medium or in aqueous alcoholic solution, or again in aqueous medium in the presence of a ion exchange resin. Generally, in all these processes the pH of the protein solution obtained is subsequently adjusted to the isoelectric point, and the precipitated protein is separated by centrifuging or filtration, for example, and dried. All these different processes are suitable for obtaining a dry protein product starting from a plant material such as soya beans for example, and more particularly, starting from soya cake.

It has, however, been observed that proteins obtained by extraction of soya beans, for example, in an aqueous medium having a pH above 6.5, have a very marked odour and taste. Although these proteins are soluble, they do exhibit a tendency to form gels, especially at high concentrations. On the other hand, proteins obtained by aqueous extraction at pH values below the isoelectric point, for example below pH 3, while having a pleasant taste and smell, precipitate irreversibly on neutralisation and are thus insoluble after neutralisation.

An object of the present invention is to provide a soluble protein fraction having a bland odour and taste.

The process for preparing a protein fraction according to this invention comprises extracting a protein-containing vegetable material with an aqueous medium at a pH value below 4, treating the resulting aqueous extract by gel filtration at a pH value below 4 and recovering a soluble protein fraction by elution.

The vegetable material preferably is one having a significant protein content. Such materials include legumes and oleaginous plants, for example soya beans, chick peas, cotton seeds and sesame seeds.

The pH of the aqueous extraction medium may be adjusted with any suitable acidic reagent. Phosphoric acid is particularly preferred as its use in the preparation of products for human consumption is generally accepted. Extraction may take place at ambient temperature, if desired with vigorous agitation to shorten the extraction time.

According to the end use of the product, for example if it is intended for incorporation in an acid or neutral beverage, the pH of the recovered eluted protein fraction may be left unchanged, or it may be adjusted to a value of or above 6.25. It has been observed that during neutralisation the proteins are precipitated when the pH passes into the region of the isoelectric point (pH 4 - 5.5), but they redissolve as the pH rises further. The product neutralised at a pH equal to or higher than 6.25 is thus at least partially soluble, and material insoluble at the desired pH may be removed.

Preferably, the aqueous extraction is performed at a pH of between 1.5 and 3, and a pH within this range is conveniently maintained in the gel filtration step, thereby maintaining the extracted proteins in solution.

The protein fraction recovered by elution is precipitated reversibly if it is neutralised on passage through the region of the isoelectric point. If the aqueous extraction in an acid medium is not followed by gel filtration of the resulting aqueous extract, then the proteins in solution in the extract are precipitated irreversibly during neutralisation. It therefore appears that the substances responsible for the irreversibility of the precipitation are separated from the proteins during the gel filtration step.

The choice of the protein starting material will normally depend on the end use of the resulting product. Thus, for example, if the soluble protein fraction is intended for incorporation in a beverage which also contains fatty substances, then it is possible advantageously to start from whole soya beans or from non-defatted soya flour. On the other hand, when the product is to be used in a beverage containing no fat, a defatted soya bean flour is advantageously used. Alternatively, a fat-containing starting material may be used, and the fat removed from the aqueous extract or milk before the gel filtration step. Moreover, the process may include sterilisation of the aqueous extract or milk before gel filtration.

The eluted fraction containing soluble proteins may be dried if desired. The flavour and taste of the product are substantially neutral.

The invention is illustrated by the following examples, in which the percentages are by weight.

EXAMPLE 1

Ten kg of a defatted soya flour are extracted in 100 liters of a dilute phosphoric acid solution at pH 2.7 for 30 minutes. After eliminating the insoluble matter by centrifuging a milk is obtained which contains approximately 6% solids having a protein content of 55%. (If the pH of this extract is adjusted to 7 with NaOH at this stage, a protein precipitate is formed irreversibly which represents 75% of the nitrogen-containing substances of the extract). Subsequently, the milk is treated by gel filtration (Sephadex G-25) while maintaining the pH throughout at 2.7. A first fraction containing essentially proteins is recovered by elution, with very small amounts of low molecular weight substances. If the pH of this fraction is adjusted to 7 with NaOH, then there is obtained a product which contains in soluble form 90% of the nitrogen-containing substance of the protein fraction.

EXAMPLE 2

Ten kg of whole, non-decorticated soya beans are comminuted finely (particles approximately 0.6 mm in diameter) in a hammer mill (Fitzmill). The ground beans are extracted in 100 liters of dilute aqueous $H_3PO_4$ at pH 3 for 20 minutes. After eliminating the insoluble matter by centrifuging, followed by a skimming at 50% and 60°C, a milk is obtained containing approximately 7.5% solids with a protein content of approximately 50%. (If the pH of this milk is adjusted to 7 with NaOH at this stage, an irreversible protein precipitate is formed which comprises 70% of the nitrogen-containing material in this milk). The milk is then treated by gel filtration (Sephadex G-25) while maintaining the pH at 3 throughout. A first eluted fraction is recovered which contains only a small amount of low molecular material (about 6.7% of ash). Adjustment of the pH of the recovered fraction to pH 7 with NaOH provides a product which contains all the nitrogen-containing material of the protein fraction in soluble form.

EXAMPLE 3

A soya milk is prepared in the manner described in Example 2. After eliminating the insoluble matter by centrifuging, the milk is sterilized by injecting steam at 140°C for 40 seconds and cooling to 20°C. (If the pH of this milk is adjusted to 7 with NaOH precipitate containing 70% of the nitrogen-containing substances of this milk is formed irreversibly). The milk is treated by gel filtration (Sephadex G-25) while maintaining the pH at 3 throughout. A first fraction is obtained by elution which contains only a small quantity of low molecular weight material (about 6.3% of ash). On adjusting the pH of this fraction to 7 with NaOH there is obtained a product containing all the nitrogen-containing material in soluble form.

EXAMPLE 4

White beans (Phaseolus vulgaris) are extracted for 20 minutes with aqueous $H_3PO_4$ solution at pH 2.7, in the proportion of one part beans to ten parts of the solution. After eliminating insoluble matter by centrifuging, there is obtained a milk containing approximately 2.3% solids having a content of nitrogenous material of about 25%. (If the pH of this extract is adjusted to 7 with NaOH at this stage, an irreversible protein precipitate is formed, representing 28% of the nitrogen-containing substances in the extract). The milk is then treated by gel filtration (Sephadex G-25) while maintaining the pH throughout at 2.7. A first fraction is recovered by elution which contains essentially proteins. On adjusting the pH of this fraction to 7 with NaOH there is obtained a product containing 100% of nitrogen-containing substances in soluble form.

EXAMPLE 5

Chick-peas are extracted for 20 minutes in a dilute aqueous $H_3PO_4$ solution at pH 2.7 in the proportion of 1 part chick-peas to 10 parts of the solution. After centrifuging a milk is obtained containing about 4% solids having a content of nitrogenous material of 45%. (If, at this stage, the pH of this milk is adjusted to 7 with NaOH, a irreversible protein precipitate is formed, representing 55% of the nitrogenous material of the milk). The milk is then treated by gel filtration (Sephadex G-25) while maintaining the pH throughout at 2.7. A first elution fraction is recovered, which contains essentially protein. On adjusting the pH of this fraction to 7 with NaOH there is obtained a product which contains 100% of nitrogenous material in soluble form.

EXAMPLE 6

Defatted sesame flour is extracted during 20 minutes in a dilute aqueous $H_3PO_4$ solution at pH 2.4 in the proportion of 1 part flour to 10 parts of solution. After centrifuging there is obtained a milk containing about 4.8 solids with approximately 38% protein. (If, at this stage, the pH of this milk is adjusted to 7 with NaOH, a irreversible protein precipitate is formed representing 60% of the nitrogenous material of the extract). The milk is then treated by gel filtration (Sephadex G-25) while maintaining the pH throughout at 2.4. A first elution fraction is recovered which contains essentially proteins. On adjusting the pH of this fraction to 7 with NaOH there is obtained a product containing 65% of nitrogenous material in soluble form.

We claim:

1. A process for the preparation of a soluble protein fraction which comprises extracting a protein-containing vegetable material with an aqueous medium at a pH value between 1.5 and 3, separating the resulting aqueous extract from vegetable material insolubles, treating said aqueous extract by gel filtration at a pH value below 4 and recovering a soluble protein fraction by elution.

2. A process according to claim 1, in which gel filtration of the aqueous extract is carried out at a pH between 1.5 and 3.

3. A process according to claim 1, in which the vegetable material is a legume or an oleaginous.

4. A process according to claim 3, in which the vegetable material is a legume or an oleaginous.

5. A process according to claim 4, in which the vegetable material comprises whole or defatted soya beans, chick peas, white beans or sesame seeds.

6. A process according to claim 1, in which the pH of the recovered fraction is adjusted to a value of at least 6.25.

7. A process according to claim 5, in which the pH of the recovered fraction is adjusted to a value of at least 6.25.

8. A process according to claim 3, in which the vegetable material is whole soya beans and fat is removed from the aqueous extract before gel filtration.

9. A process according to claim 6, in which the vegetable material is whole soya beans and fat is removed from the aqueous extract before gel filtration.

* * * * *